United States Patent [19]

Furuta et al.

[11] Patent Number: 5,182,151
[45] Date of Patent: Jan. 26, 1993

[54] THERMOPLASTIC RESIN COMPOSITION

[75] Inventors: Motonobu Furuta, Tsukuba; Mitsuji Tsuji, Ichihara, both of Japan

[73] Assignee: Sumitomo Chemical Company, Limited, Osaka, Japan

[21] Appl. No.: 545,827

[22] Filed: Jun. 29, 1990

[30] Foreign Application Priority Data

Jul. 10, 1989 [JP] Japan .................. 1-177717

[51] Int. Cl.$^5$ .................. B29D 22/00; C08F 283/08; C08L 71/12
[52] U.S. Cl. .................. 428/36.92; 525/68; 525/133; 525/391; 525/393; 525/396; 525/397; 525/905
[58] Field of Search .................. 525/68, 133, 391, 393, 525/396, 397, 905; 428/36.92

[56] References Cited

FOREIGN PATENT DOCUMENTS

| 0142166 | 5/1985 | European Pat. Off. |
| 0239347 | 9/1987 | European Pat. Off. |
| 0268486 | 5/1988 | European Pat. Off. |
| 0299619 | 1/1989 | European Pat. Off. |
| 0329423 | 8/1989 | European Pat. Off. |
| 128056 | 5/1988 | Japan |
| 210456 | 8/1989 | Japan |

OTHER PUBLICATIONS

"Hawley's Condensed Chemical Dictionary", Eleventh Ed., Irving Sax and Richard J. Lewis, Van Nostrand Reinhold Co.
JP-A-63130660 (No. 88-193716) (Jun. 1988).
JP-A-63118344 (No. 88-180137) (May, 1988).

Primary Examiner—Carman J. Seccuro, Jr.
Assistant Examiner—Thomas Hamilton, III
Attorney, Agent, or Firm—Birch, Stewart, Kolasch & Birch

[57] ABSTRACT

A thermoplastic resin composition is disclosed which comprises
(a) a modified polyphenylene ether or a composition containing it, and
(b) (i) a modified propylene polymer comprising propylene polymer which is graft-copolymerized with a styrene based monomer or with a mixture of a styrene based monomer and a monomer copolymerizable therewith, or (ii) a composition containing the modified propylene polymer in (b)-(i) and propylene polymer. The resin composition may contain (c) a rubber-like substance containing at least one rubber-like substance having a polar group and/or (d) a melt flow characteristics improving agent.

13 Claims, No Drawings

THERMOPLASTIC RESIN COMPOSITION

BACKGROUND OF THE INVENTION

1. Field of the invention

This invention relates to a novel thermoplastic resin composition suitable for preparing shaped articles by injection molding or extrusion molding.

2. Related Art

Generally, polyphenylene ether is a resin superior in heat resistance, hot water resistance, dimensional stability, various mechanical properties, electrical properties and the like but on the other hand it has disadvantages in that it is inferior not only in processability due to its high melt viscosity but also inferior in chemical resistance and impact resistance.

A composite material comprising polyphenylene ether and polystyrene is proposed in order to lessen melt viscosity of polyphenylene ether and to improve processability thereof, leaving various other good properties of polyphenylene ether unchanged. However, its chemical resistance still remains to be improved.

On the other hand, propylene polymer is a familiar material for preparing various shaped articles, film and sheet since it is superior in processability, toughness, water resistance and chemical resistance, as well as it has low specific gravity and is inexpensive. However, propylene polymer has problems in heat resistance, rigidity, impact resistance, coatability, adhesiveness and the like, which is an obstacle to development of new practical application thereof. Therefore, there is a keen desire for improvement of its properties, among others, heat resistance and impact resistance.

Accordingly, development is expected in new application to a variety of utility if a resin composition is prepared in which polyphenylene ether and propylene polymer are blended, maintaining favorite properties of both components and having improved processability and impact resistance. However, in actuality, the blending of propylene polymer with polyphenylene ether results in poor compatibility, and shaped articles which can be obtained by injection molding the blended composition show phase separation between polyphenylene and propylene polymer, thus giving rise to only those shaped articles which have poor appearance and inferior mechanical properties; they are unacceptable for practical purposes. However, there is on the market increasing demand for a resin composition which retains excellent heat resistance ascribable to polyphenylene ether and also high impact resistance and superior weatherability and coatability.

SUMMARY OF THE INVENTION

In view of the above problems extensive research has been made with view to developing effective technologies for the improvement of resin compositions composed of polyphenylene ether, propylene polymer and a rubber-like substance. As the result this invention has been completed.

Therefore, this invention provides a thermoplastic resin composition comprising
  (a) a modified polyphenylene ether or a composition containing it, and
  (b) (i) a modified propylene polymer comprising propylene polymer which is graft-copolymerized with a styrene based monomer or with a mixture of a styrene based monomer and a monomer copolymerizable therewith, or (ii) a composition containing the modified propylene polymer in (b)-(i) and propylene polymer.

This invention also provides a thermoplastic resin composition comprising
  (a) a modified polyphenylene ether or a composition containing it,
  (b) (i) a modified propylene polymer comprising propylene polymer which is graft-copolymerized with a styrene based monomer or with a mixture of a styrene based monomer and a monomer copolymerizable therewith, or (ii) a composition containing the modified propylene polymer in (b)-(i) and propylene polymer, and
  (c) a rubber-like substance containing at least one rubber-like substance having a polar group.

Further, this invention provides a thermoplastic resin composition comprising a thermoplastic resin composition comprising
  (a) a modified polyphenylene ether or a composition containing it,
  (b) (i) a modified propylene polymer which is graft-copolymerized with a styrene based monomer or with a mixture of a styrene based monomer and a monomer copolymerizable therewith, or (ii) a composition containing the modified propylene polymer in (b)-(i) and propylene polymer, and
  (d) a melt flow characteristics improving agent.

Still further, this invention provides a thermoplastic resin composition comprising
  (a) a modified polyphenylene ether or a composition containing it,
  (b) (i) a modified propylene polymer which is graft-copolymerized with a styrene based monomer or with a mixture of a styrene based monomer and a monomer copolymerizable therewith, or (ii) a composition containing the modified propylene polymer in (b)-(i) and propylene polymer,
  (c) a rubber-like substance containing at least one rubber-like substance having a polar group, and
  (d) a melt flow characteristics improving agent.

Also, this invention provides a thermoplastic resin composition comprising
  (a) a modified polyphenylene ether or a composition containing it,
  (b) (i) a modified propylene polymer which is graft-copolymerized with a styrene based monomer or with a mixture of a styrene based monomer and a monomer copolymerizable therewith, or (ii) a composition containing the modified propylene polymer in (b)-(i) and propylene polymer,
  (c) a rubber-like substance containing at least one rubber-like substance having a polar group, and
  (d) a melt flow characteristics improving agent,
wherein the proportion of the component (a) to the component (b) is 1 to 98% by weight of (a) : 99 to 2% by weight of (b), wherein the component (c) is present in an amount of 0 to 50 parts by weight per 100 parts by weight of the sum of the components (a) and (b), and wherein the component (d) is present in an amount of 0 to 30 parts by weight per 100 parts by weight of the sum of the components (a), (b) and (c).

DETAILED DESCRIPTION OF THE INVENTION

The polyphenylene ether used in the component (a) in the present invention is a polymer which can be obtained, for example, by oxidation polymerization of one or more phenol compounds having the formula (I)

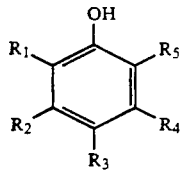

wherein $R_1$, $R_2$, $R_3$, $R_4$ and $R_5$ each represents a hydrogen atom, a halogen atom, a substituted or unsubstituted hydrocarbon residue, or a substituted or unsubstituted hydrocarbon oxy group provided that at least one of $R_1$, $R_2$, $R_3$, $R_4$ and $R_5$ is a hydrogen atom, with oxygen or gas containing the same in the presence of an oxidation coupling catalyst.

Examples of $R_1$ to $R_5$ are a hydrogen atom, a chlorine atom, a bromine atom, a fluorine atom, an iodine atom, a methyl group, an ethyl group, an n- or isopropyl group, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group and an allyl group.

Examples of the phenol compounds are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethyl-phenol, 3-methyl-6-tert.-butylphenol, thymol and 2-methyl-6-allylphenol. Alternatively, copolymer of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolak resin.

Preferred examples of the polymers are homopolymer of 2,6-dimethylphenol or 2,6-diphenylphenol and copolymers of a large amount of 2,6-dimethylphenol and a small amount of 3-methyl-6-tert.-butylphenol or of 2,3,6-trimethylphenol.

Any oxidation coupling catalyst may be employed for oxidation polymerization of phenol compound, as long as it has polymerization ability. Examples thereof are cuprous compound/tert. amine such as cuprous chloride/triethylamine and cuprous chloride/pyridine; cupric compound/amide/alkali metal hydroxide such as cupric chloride/pyridine/potassium hydroxide; manganese salt/primary amine such as manganese chloride/ethanolamine and manganese acetate/ethylenediamine; manganese salt/alcoholate or phenolate such as manganese chloride/sodium methylate and manganese chloride/sodium phenolate; and cobalt salt/tert. amine.

Polymerization of polyphenylene ether is roughly grouped into high temperature polymerization which is performed at a temperature higher than 40° C. and low temperature polymerization which is carried out at a temperature no higher than 40° C., and it is known that the products obtained by both the polymerization reactions differ from each other in their physical properties and the like. In this invention product of either high temperature polymerization or low temperature polymerization may be used.

The reduced viscosity (measured in chloroform at 30° C.) of the polyphenylene resin which is used in this invention is not limited particularly, and is preferably 0.2 to 1.0 dl/g, and more preferably 0.25 to 0.6 dl/g. Optimum reduced viscosity may be selected depending on the situation.

The polyphenylene ether, component (a), which can be used in this invention includes modified polyphenylene ether described in detail hereinbelow. The modified polyphenylene ether may be used depending on needs on the market, if desired.

In this invention, polyfunctional compound (e) is used as a modifying agent for modifying the polyphenylene ether to prepare the component (a). The polyfunctional compound (e) is a polyfunctional compound which has in its molecule at least one functional group selected from the class consisting of a carboxylic acid group, an acid anhydride group, an acid amide group, an imido group, a carboxylic acid ester group, an epoxy group, an amino group and a hydroxyl group. Preferably, the polyfunctional compound (e) is a compound (f) which has simultaneously (i) a carbon-to-carbon double bond or a carbon-to-carbon triple bond, and (ii) at least one functional group selected from a carboxylic acid group, an acid anhydride group, an acid amide group, an imido group, a carboxylic acid ester group, an epoxy group, an amino group and a hydroxyl group.

Suitable examples of the compound (f) include maleic anhydride, maleic acid, fumaric acid, maleimide, maleic acid hydrazide, a reaction product of maleic anhydride and a diamine, e.g., compounds having general formulas (II) or (III)

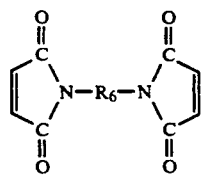

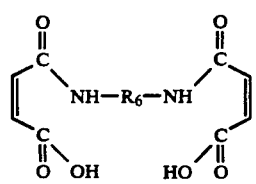

wherein $R_6$ is an aliphatic or aromatic group, methylnadic anhydride, dichloromaleic anhydride, maleic acid amide, and natural fats and oils such as soybean oil, tung oil, castor oil, linseed oil, hempseed oil, cottonseed oil, sesame oil, rapeseed oil, peanut oil, camellia oil, olive oil, coconut oil and sardine oil; epoxylated natural fats and oils such as epoxylated soybean oil; unsaturated carboxylic acids such as acrylic acid, butenoic acid, crotonic acid, vinyl acetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2 methyl-2-pentenoic acid, 3-methyl-2-pentenoic acid, α- ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleostearic acid, oleic acid, eicosapentaenic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid; ester, acid amide or anhydride of unsaturated carboxylic acid above; unsaturated alcohol such as allyl alcohol, crotyl alcohol, methylvinyl carbinol, allyl carbinol, methylpropenyl carbinol, 4-penten-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohol of the formula: $C_nH_{2n-5}OH$, $C_nH_{2n-7}OH$ or $C_nH_{2n-9}OH$ (n is a positive integer), 3-buten-1,2-diol, 2,5-dimethyl-3-hexene-2,5-diol, 1,5-hexadiene-3,4-diol or 2,6-octadiene-4,5-diol; unsaturated amine such as that where an OH group of the unsaturated alcohol is replaced by an —$NH_2$ group; and low polymers of butadiene, isoprene or the like (for example, those with mean molecular weight of about 500 to 10,000) or adduct of high polymer (for example, those with mean molecular weight of 10,000 or more) with maleic anhydride or a phenolic compound, or those in which an amino group, a carboxylic acid group, a hydroxyl group, an epoxy group or the like is introduced therein.

Other preferred examples of the polyfunctional compound (e) are compound (g) which is selected from an aliphatic carboxylic acid, acid ester and acid amide of general formula (IV):

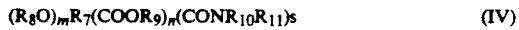

$$(R_8O)_mR_7(COOR_9)_n(CONR_{10}R_{11})_s \qquad (IV)$$

wherein $R_7$ is a straight- or branched-chain saturated aliphatic hydrocarbon group having 2 to 20 carbon atoms; $R_8$ is a group selected from a hydrogen atom, and an alkyl group, an aryl group, an acyl group and a carbonyl dioxy group each having 1 to 10 carbon atoms; $R_9$ each is independently a group selected from a hydrogen atom, and an alkyl group and an aryl group each having 1 to 20 carbon atoms; $R_{10}$ and $R_{11}$ each are independently a group selected from a hydrogen atom, and an alkyl group and an aryl group each having 1 to 10 carbon atoms, and m, n and s are 0 or integers of 1 or more, provided that $m+n+s \geq 2$; and derivatives thereof.

Specific examples of the compound (g) include oxyacetic acid, lactic acid, α-oxy-n-butyric acid, α-oxyisobutyric acid, α-oxy-n-valeric acid, α-oxyisovaleric acid, 2-oxy-2-methylbutanoic acid, α-oxy-n-caproic acid, α-oxyisocaproic acid, 2-ethyl-2-oxybutanoic acid, 2-oxy-3,3-dimethylbutanoic acid, 2-oxy-2-methylpentanoic acid, 2-oxy-5-methylhexanoic acid, 2-oxy-5-methylhexanoic acid, 2-oxy-2,4-dimethylpentanoic acid, 3-oxypropionic acid, β-oxy-butyric acid, β-oxyisobutyric acid, β-oxy-n-valeric acid, β-oxyisovaleric acid, 2-oxymethylbutanoic acid, oxypivalic acid, 3-oxy-2-methylpentanoic acid, 1,1-oxytetradecanoic acid, jalapinolic acid, 1,4-oxyhexadecanoic acid, sabinic acid, juniperic acid, oxymalonic acid, methyltartronic acid, ethyltartronic acid, n-propyltartronic acid, isopropyltartronic acid, oxymethylmalonic acid, oxyisopropylmalonic acid, ethyloxymethylmalonic acid, malic acid, α-methylmalic acid, α-oxy-α'-methylsuccinic acid, α-oxy-α, α'-dimethylsuccinic acid, α-oxy-α',α'-diethylsuccinic acid, α-oxy-α'-ethylsuccinic acid, α-oxy-α'-methyl -α- ethylsuccinic acid, trimethylmalic acid, α-oxyglutaric acid, β-oxyglutaric acid, β-oxy-β-methylglutaric acid, α-oxyadipic acid, citric acid, isocitric acid, norcaperatic acid, agaricic acid, glyceric acid, α,β-dioxybutyric acid, α,β-dioxyisobutyric acid, β,β'-dioxyisobutyric acid, β,γ-dioxybutyric acid, α,γ-dioxy-β,β-dimethylbutyric acid, α,β-dioxy-α-isopropylbutyric acid, isoprolic acid, ustic acid-A, 9.10-dioxyocta-decanoic acid, tartaric acid (optical active isomer or racemic modification), mesotartaric acid, methyltartaric acid, α,β-dioxyglutaric acid, α,γ-dioxy-glutaric acid, α,γ-dioxy-β-methylglutaric acid, α,γ-dioxy-β-methyl-β-ethylglutaric acid, α,γdioxy -α,γ-dimethylglutaric acid, α,δ-dioxyadipic acid, β,γ-dioxyadipic acid, 6,7-dioxydodecanedioic acid, 7,8-dioxyhexadecanedioic acid, furoic acid, trioxybutyric acid, trioxyisobutyric acid, trioxyglutaric acid, succinic acid, glutaric acid, adipic acid, α-methylglutaric acid, dodecanedioic acid, and the like.

The derivatives of the compound of general formula (IV) are their lactones, acid anhydrides, alkali metal salts, alkaline earth metal salts, amine salts and the like. Specific examples thereof include β-propionolactone, glycolide, lactide, β-methylproionolactone, β,β-dimethylpropionolactone, β-n propylpropionolactone, β-isopropylpropionolactone, β-methyl-β-ethylpropionolactone, γ-butyrolactone, γ-valerolactone, δ-valerolactone, δ-caprolactone, ε-caprolactone, 1,5-oxypentadecanoyllactone, γ-butyrolactone-α-carboxylic acid, paraconic acid, β-methylparaconic acid, α-ethylparaconic acid, α-isopropyl paraconic acid, γ-methylparaconic acid, γ-ethylparaconic acid, α,γ-dimethylparaconic acid, β,γ-dimethylparaconic acid, α,α,β-trimethylparaconic acid, γ,γ-dimethylparaconic acid, nephrosteraic acid, γ-valerolactone-γ-carboxylic acid, γ-isopropyl-γ-butyrolactone-γ-carboxylic acid, α,α-dimethyl-γ-butyrolactone-γ-carboxylic acid, β-methyl-γ-valerolactone-γ-carboxylic acid, α,β-dimethyl-γ-valero lactone-γ-carboxylic acid, α,β-dimethyl-γ-butyrolactone-γ-carboxylic acid, α-(γ-oxycarbonylpropyl)-γ-butyrolactone, β-oxyadipic acid-γ-lactone, α,δ-dimethyl-β-oxyadipic acid γ-lactone, β-oxy-β-methyladipic acid-γ-lactone, α-(δ'-carboxy-n-butyl)-γ-butyrolactone, α-methylmethylisocitric acid lactone, cinchonic acid, α-oxy-γ-butyrolactone, β-oxy -γ-butyrolactone, δ-oxy-γ-valerolactone, pantolactone, mevalonic acid, malic anhydride, tartaric anhydride, oxyglutaric anhydride, α,β,γ-trioxyvalerolactone, α-oxy-α-oxymethyl-γ-butyrolactone, succinic anhydride, glutaric anhydride, and the like. These compounds can be used singly or two or more of them can be used in combination.

Among them, particularly preferred are tartaric acid, malic acid, citric acid and derivatives thereof in which there are included various commercial preparations of such acids (e.g., dehydrated or hydrated acids).

Examples of useful derivatives include acetyl citrate, monostearyl and/or distearyl citrate, N,N'-diethyl citric acid amide, N,N'-dipropyl citric acid amide, N-phenylcitric acid amide, N-dodecyl citric acid amide, N,N'-didodecyl citric acid amide and N-dodecyl citric acid amide, calcium malate, calcium citrate, potassium malate and potassium citrate.

Other preferred polyfunctional compound (e) is a compound (h) which has in its molecule (i) an acid halide group, particularly an acid chloride group, and (ii) at least one carboxylic acid group, carboxylic anhydride group, acid ester group or acid amide group, preferably a carboxylic acid group or a carboxylic anhydride group.

Specific examples of the compound (h) include anhydrotrimellityl chloride, chloroformylsuccinic anhydride, chloroformylsuccinic acid, chloroformylglutaric anhydride, chloroformylglutaric acid, chloroacetylsuccinic anhydride, chloroacetylsuccinic acid, trimellityl chloride, and chloroacetylglutaric acid. Among these, anhydrotrimellityl chloride is preferred.

The compounds (e), (g) and (h) are described in detail in U.S. Pat. Nos. 4,315,086 and 4,642,358.

In this invention, an epoxy compound (j), which is an epoxy compound composed of a condensation polymer of a compound having an oxirane group in its molecule and/or a divalent phenol with epichlorohydrin, can be used as a modifying agent for modifying the polyphenylene ether Specific examples of the epoxy compound (j) are epoxides of olefins or cycloalkenes such as ethylene oxide, propylene oxide and cyclohexene oxide.

In addition, there can be used condensation products obtained by condensing dihydric phenols with epichlorohydrin in various proportions. As for representative examples thereof, there can be cited, for example, condensation products of bisphenol A with epichlorohydrin (commercial products are, for example, ELA-115, ELA-127, ELA-128, ELA-134, ESA-011, ESA-014 and ESA-019 (trade names for products by SUMITOMO CHEMICAL CO., LTD.), and phenoxy resins produced by UNION CARBIDE CO., and the like), condensation products of resorcin with epichlorohydrin, condensation products of hydroquinone with epichlorohydrin, condensation products of tetrabromobisphenol A with epichlorohydrin, glycidyl etherized phenol novolak or cresol novolak (for example, SUMIEPOXY ESCN-220 (trade name for the product by SUMITOMO CHEMICAL CO., LTD.), and the like.

Also, there can be used condensation products of a polyhydric alcohol with epichlorohydrin. Representative examples of the polyhydric alcohol are ethylene glycol, propylene glycol, butylene glycol, polyethylene glycol, propylene polymer glycol, glycerol, triethylolethane, trimethylolpropane, pentaerythritol, etc.

There can also be used glycidyl etherized monohydric phenol or alcohol such as phenyl glycidyl ether, butyl glycidyl ether and cresyl glycidyl ether.

Further, glycidylated amine compounds can be used. Commercial product thereof includes, for example, SUMIEPOXY ELN-125 (trade name for glycidylated aniline produced by SUMITOMO CHEMICAL CO., LTD.).

Furthermore, there can be used high polymers of unsaturated epoxy-containing compounds (for example, glycidyl acrylate, glycidyl methacrylate or allyl glycidyl ether), or copolymers of the unsaturated epoxy-containing compound with one or more other monomers (for example, ethylene, propylene, butene, styrene, α-methylstyreme, 4-methylpentene, chlorostyrene, bromostyrene, acrylic acid, acrylic acid ester, acrylonitrile, vinyl chloride, methacrylic acid, methacrylic acid ester, maleic a hydride, vinyl acetate, etc.).

Among these polymers, particularly preferred are styrene/glycidyl methacrylate copolymers and ethylene/glycidyl methacrylate copolymers.

In this invention, an organosilane compound (k) is used as a modifying agent for modifying the polyphenylene ether. The organosilane compound (k) is an organosilane compound which contains in its molecule (i) at least one silicon atom bonded to a carbon atom via an oxygen atom, (ii) a carbon-to-carbon double bond or a carbon-to carbon triple bond, and (iii) at least one functional group selected from the class consisting of an amino group, a mercapto group, a carboxylic acid group, an acid anhydride group, an acid amide group, a carboxylic acid ester group, an imide group and a hydroxyl group, simultaneously.

In the Compound (k), the component C—O—Si is present usually in the form of an alkoxy group or acetoxy group which is directly bonded to the silicon atom. Such alkoxy or acetoxy group generally has less than 15 carbon atoms and may contain a hetero atom (for example, oxygen).

Further, the compound (k) may contain two or more silicon atoms in its molecule. When plural silicon atoms are present, they are bonded to each other via oxygen bond (for example, in the case of cyclohexane), silicon-to-silicon bond, or a bifunctional organic group (for example, a methylene group or a phenylene group.

Suitable examples of the organosilane compound (k) include γ-aminopropyltriethoxysilane, 2-(3-cyclohexenyl) ethyltrimethoxysilane, 1,3-divinyltetraethoxysilane, vinyltris(2-methoxyethoxy)silane, 5-bicycloheptenyltriethoxysilane and γ-mercaptopropyltrimethoxysilane.

The amount of the compounds (e), (f), (g), (h), (j) and (k) to be used is selected appropriately depending on the purpose and generally is no more than 200 parts by weight, preferably no more than 80 parts by weight, more preferably no more than 20 parts by weight, and most preferably from 0.01 to 10 parts by weight, per 100 parts by weight of polyphenylene ether.

Upon modifying the polyphenylene ether with the compound (e), (f), (g), (h), (j) or (k), a free-radical initiator may be used. The free-radical initiator includes known organic peroxides and diazo compounds. For example, there can be used azo compounds such as 2,2'-azobisisobutyronitrile and 2,2'-azobis(2,4,4-trimethylvaleronitrile), and various organic peroxides such as methyl ethyl ketone peroxide, cyclohexanone peroxide, 3,3,5-trimethylcyclohenxanone peroxide, 2,2-bis(t-butylperoxy) butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t butyl peroxyisopropyl)benzene, 2,5-dimethyl-2,5-di (t-butylperoxy)hexane, 2,5-dimethyl-2,5-di(t-butylperoxy) hexyne-3, lauroyl peroxide, 3,3,5-trimethylhexanoyl peroxide, benzoyl peroxide, t-butyl peracetate, t-butyl peroxyisobutyrate, t-butyl peroxypivalate, t-butyl peroxy-3,5,5-trimethylhexanoate, t-butyl peroxylaurate, t-butyl peroxybenzoate, di-t-butyl peroxyisophthalate, 2,5-dimethyl-2,5-bis (benzoylperoxy)hexane, t butyl peroxymaleic acid, t-butyl peroxypropylcarbonate and polystyrene peroxide.

Preferred examples thereof are benzoyl peroxide, dicumyl peroxide, di-t-butyl peroxide, t-tubylcumyl peroxide, t butyl hydroperoxide, cumene hydroperoxide and azobisisobutyronitrile.

The amount of the free-radical initiator to be used is 0.01 to 10 parts by weight, preferably 0.1 to 5 parts by weight, per 100 parts by weight of polyphenylene ether.

The modified polyphenylene ether which is used in the present invention may be a product of chemical reaction between polyphenylene ether and the above-described compound or a product of physical interaction (for example, physical adsorption of the above-described compound on polyphenylene ether).

Preferred polyphenylene ether includes one which is obtained by graft polymerizing an unsaturated monomer other than the above-described polyfunctional compound (f) having an unsaturated group or the polyfunctional Compound (f) having an unsaturated group and an unsaturated monomer other than the compound (f) to polyphenylene ether in the presence of a free-radical initiator.

The unsaturated monomer is preferably a vinyl and/or vinylidene compound (1).

Specific examples of the compound (1) include aromatic vinyl or vinylidene compounds such as α-methylstyrene, o-m- and p-methylstyrene, chlorostyrene, bromostyrene, divinylbenzene, hydroxystyrene, aminostyrene; olefins such as ethylene; methacrylic acid esters such as methyl methacrylate, ethyl methacrylate, propyl methacrylate and octyl methacrylate; cyanovinyl compounds such as acrylonitrile, and methacrylonitrile; vinyl ester compounds such as vinyl acetate; vinyl ether compounds such as methylvinyl ether, ethyl vinyl ether and butyl vinyl ether; unsaturated halides such as vinyl chloride and vinylidene chloride; and the like. These compounds can be used singly or two or more of them can be used in combination.

Preferred examples of the unsaturated monomer to be used in graft polymerization include styrene, styrene/glycidyl methacrylate, styrene/glycidyl acrylate, styrene/maleic anhydride, styrene/acrylic acid, and styrene/methacrylic acid.

The amount of the compound (1) to be used is no more than 200 parts by weight, preferably 0.5 to 100 parts by weight, and more preferably 1 to 50 parts by weight, per 100 parts by weight of polyphenylene ether.

There is no limitation in the method of producing the modified polyphenylene ether to be used in this invention and any known methods can be used for the purpose. For example, there can be used the following methods:

(1) a method in which polyphenylene ether and the above-described compound in the form of pellets, powder or small chips are mixed uniformly using high speed stirrer or the like, and then blended by melt-kneading.

(2) a method in which the above-described compound is added to a solution in which polyphenylene ether has been dissolved or swelled to dissolve or swell the added compound, and the mixture is heated with stirring.

(3) a method in which the above-described compound is added to polyphenylene ether and the mixture is dispersed in water, and then heated with stirring.

In these methods, it is preferred to use a dispersion stabilizer such as polyvinyl alcohol, sodium dodecylbenzenesulfonate or calcium phosphate. Furthermore, a solvent may be added which can dissolve or swell polyphenylene ether, if desired.

In the method (1), there are no limitations on the temperature and time of melt-kneading. The temperature may vary depending on the kind and amount of the compound used but generally it is in the range of 150° to 350° C. Any type of apparatus may be used for melt-kneading as far as it permits operation of viscous molten materials. The apparatus may be operated either batchwise or continuously. Specific examples of the apparatus are single-screw or multi-screw extruder, Banbury mixer, rolls, kneader, and the like.

There is no limitation on solvents which can be used in the methods (2) and (3) and any solvents can be used as far as they can dissolve or swell polyphenylene ether. Specific examples thereof include chloroform, methylene chloride, benzene, xylene, chlorobenzene, cyclohexane, styrene, toluene, o-chlorophenol and the like. Mixed solvents may also be used as far as they can dissolve or swell polyphenylene ether.

There are no limitations on the temperature and time of blending. Generally, the temperature is in the range of 20° to 250° C. and the time is in the range of 1 minute to 10 hours.

In this invention, when the modified polyphenylene ether is used, it is preferred to produce modified polyphenylene ether beforehand and then mix it with other components before the resin composition of the invention can be produced. However, it is also possible to mix the above-described compound as a modifying agent, polyphenylene ether and other components in a lump for producing the composition of this invention.

The modified polyphenylene ether in the abovedescribed component (a) may be used singly or two or more kinds of it may be used in combination.

The composition containing a modified polyphenylene ether as component (a) in the resin composition of this invention means a resin composition composed of the abovedescribed modified polyphenylene ether and one or more other polymers.

As the other polymers, there can be cited, for example, polyolefin such as polymethylpentene; homopolymers or copolymers of various vinyl compounds such as polyvinyl chloride, polymethyl methacrylate, polyvinyl chloride, polyvinylpyridine, polyvinylcarbazole, polyacrylamide, polyacrylonitrile, ethylene/vinyl acetate copolymer and alkenyl/aromatic resin; polycarbonate, polysulfone, polyethylene terephthalate, polybutylene terephthalate, polyarylene ester (for example, U polymer produced by UNITIKA CO.), polyphenylene sulfide; polyamides such as Nylon-6, Nylon-6,6 and Nylon-12; condensed high polymers such as polyacetal, and the like. Also, there can be cited various thermo-setting resins such as silicone resins, fluorine resins, polyimides, polyamideimides, phenol resins, alkyd resins, unsaturated polyester resins, epoxy resins and diallyl phthalate resins.

In the thermoplastic resin composition of this invention, there is used, in addition to the component (a), (i) a modified propylene polymer comprising propylene polymer which is graft-copolymerized with a styrene based monomer or with a mixture of a styrene based monomer and a monomer copolymerizable therewith, or (ii) a composition containing the modified propylene polymer in (i) and propylene polymer, as component (b).

The modified propylene polymer used herein refers to a propylene polymer obtained by graft-copolymerizing to propylene polymer 0.2 to 150 parts by weight, preferably 2 to 90 parts by weight and more preferably 3 to 70 parts by weight of styrene based monomer or a mixture of styrene based monomer and a monomer copolymerizable therewith per 100 parts by weight of propylene polymer. When the monomer to be graft copolymerized is in an amount of less than 0.2 parts by weight, no effect is observed on improvement of the resin. On the other hand, chemical resistance of the resin decreases when the amount of the monomer to be copolymerized exceeds 150 parts by weight.

By the term "propylene polymer" is meant propylene homopolymer and propylene copolymer. "Propylene copolymer" is random or block copolymer of propylene and ethylene and/or α-olefin having 4 to 18 carbon atoms.

Examples of propylene copolymer include ethylene/propylene copolymer, propylene/butene-1 copolymer, propylene/hexene-1 copolymer, propylene/4-methylpentene 1 copolymer, propylene/octene-1 copolymer, and the like.

In this invention, highly crystalline propylene polymer may be used as the propylene polymer in the component (b), if desired.

By the term "highly crystalline propylene polymer" is meant a propylene homopolymer or block copolymer which has an isotactic pentad fraction of 0.970 or higher, defined as an isotactic pentad fraction in the boiling heptane insoluble portion of the propylene homopolymer or of a propylene homopolymer portion of the propylene block copolymer that is the first segment polymerized in the first step of propylene block copolymer formation, or a propylene polymer which has an isotactic pentad fraction defined as above of 0.970 or higher and a content of a heptane-soluble portion of 5.0% by weight or less and a content of 20° C. a xylene soluble portion of 2.0% by weight or less.

The above-described type of highly crystalline propylene polymers can be prepared by methods described in, for example, Japanese Patent Publication (Kokai) Nos. 28405/1985, 228504/1985, 208606/1986 and 287917/1986.

For applications to those fields where high rigidity is required for, it is preferred to blend the propylene polymer with a nuclei generating agent. It is known that addition of, for example, aluminum or sodium salts of aromatic carboxylic acids (Japanese Patent Publication (Kokai) No.80829/1983), and aromatic carboxylic acids, metal salts of aromatic phosphoric acids or sorbitol derivatives (Japanese Patent Publication (Kokoku) No.12460/1980 and Japanese Patent Publication (Kokai) No. 129036/1983) or the like gives rise to nuclei of crystal grains thus serving a nuclei generating agent (hereinafter, referred to as a nucleating agent).

It is also known that a polymer of vinylcycloalkane having 6 or more carbon atoms is effective as a nucleating agent (Japanese Patent Publication (Kokai) No.1738/1987).

That is, a composition which comprises the propylene polymer blended with the polymer of vinylcycloalkane polymer having 6 or more carbon atoms and which contains from 0.05 to 10,000 ppm by weight of vinylcycloalkane unit in the composition has a higher crystallinity.

Furthermore, a propylene polymer having a high rigidity can be obtained by blending the propylene polymer having a high rigidity with the vinylcycloalkane polymer.

As the propylene polymer, there can be used propylene homopolymer or propylene copolymer alone, or in the form of a mixture of two or more of them.

Ethylene/α-olefin copolymer or ethylene/α-olefin copolymer modified with a styrene based monomer may be added to the propylene polymer as the component (b). The ethylene/α-olefin copolymer preferably has a density of 0.82 to 0.92 g/cm³.

The styrene based monomer which can be used in modifying the propylene polymer by graft copolymerization is represented by the formula (V) below

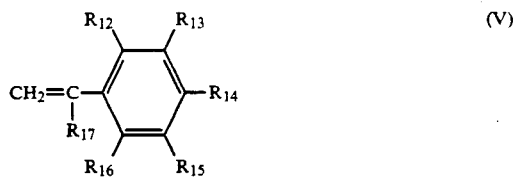

wherein $R_{12}$, $R_{13}$, $R_{14}$, $R_{15}$ and $R_{16}$ each represents a hydrogen atom, a halogen atom, a substituted or unsubstituted hydrocarbon residue, or a substituted or unsubstituted hydrocarbyloxy residue, and $R_{17}$ represents a hydrogen atom or a lower alkyl group having from 1 to 4 carbon atoms.

Specific examples of the atoms, groups or residues represented by $R_{12}$, $R_{13}$, $R_{14}$, $R_{15}$ or $R_{16}$ include a hydrogen atom, halogen atoms such as a chlorine atom, a bromine atom and an iodine atom, a hydrocarbon residues such as a methyl group, an ethyl group, a propyl group, a vinyl group, an allyl group, a benzyl group and a methylbenzyl group; substituted hydrocarbon groups such as a chloromethyl group and a bromomethyl group; unsubstituted or substituted hydrocarbyloxy residues such as a methoxy group, an ethoxy group, a phenoxy group and a monochloromethoxy group, and the like.

Specific examples of $R_{17}$ include a hydrogen atom, lower alkyl groups such as a methyl group and an ethyl group, and the like.

Specific examples of the styrene based monomer include styrene, 2,4-dichlorostyrene, p-methoxystyrene, p-methylstyrene, p-phenylstyrene, p-divinylbenzene, p-(chloromethoxy)styrene, α-methylstyrene, o-methyl-α-methylstyrene, m-methyl-α-methylstyrene, p-methyl-α-methylstyrene and p-methoxy-α-methylstyrene. These compounds may be used singly or two or more of them may be used in the form of a mixture. Of these, styrene is preferred.

As for graft copolymerization component for preparing the modified propylene polymer in the component (b), there can also be used a mixture of the above-described styrene based monomer and a monomer copolymerizable therewith.

A thermoplastic resin having superior mechanical properties can be obtained by appropriately selecting the monomer which is copolymerizable with the styrene based monomer, graft-copolymerizing it to propylene polymer and blending the resulting modified propylene polymer with polyphenylene ether or a composition containing it.

Specific examples of the monomer copolymerizable with the styrene based monomer include acrylonitrile, methacrylonitrile, fumaric acid, maleic acid, vinyl ketone, maleic anhydride, acrylic acid, methacrylic acid, glycidyl methacrylate, glycidyl acrylate, vinylidene chloride, maleic acid ester, methyl methacrylate, ethyl methacrylate, propyl methacrylate, butyl methacrylate, methyl acrylate, ethyl acrylate, propyl acrylate, butyl acrylate, vinyl chloride, vinyl acetate, divinylbenzene, ethylene oxide, isobutene, alkyl vinyl ether, anetol, indene, cumarone, benzofuran, 1,2-dihydronaphthalene, acenaphthylene, isoprene, chloroprene, trioxane, 1,3-dioxorane, propylene oxide, β-propionolactone, vinylbiphenyl, 1,1-diphenylethylene, 1-vinylnaphthalene, 2-vinylnaphthalene, 2-vinylpyridine, 4-vinylpyridine, 2,3-dimethylbutadiene, ethylene, propylene, allyltrimethylsilane, 3-butenyltrimethylsilane, vinylcarbazole N,N-diphenylacrylamide fumaronitrile, and the like. Derivatives of these monomers can also be used.

They may be used singly or two or more of them may be used in combination.

Among them, preferred are maleic anhydride, methyl methacrylate, acrylonitrile and the like.

Blending ratio between the styrene based monomer and the monomer copolymerizable therewith may be varied freely depending on the purpose but it is preferred that the styrene based monomer is present in an amount of 1 to 100% by weight based on the total weight of the monomers.

There is no limitation on the method of producing the modified propylene polymer by graft-copolymerizing the styrene based monomer or a mixture of the styrene based monomer and other monomer copolymerizable therewith, and there may be used any known methods such as a suspension polymerization method, an emulsion polymerization method, solution polymerization method or a bulk polymerization method (including a method in which a polymerization tank is used and as well a method in which an extruder is used) and the like.

More particularly, there is used a method in which at first styrene/acrylonitrile copolymer is produced by anion polymerization and the copolymer obtained is melt-kneaded together with a peroxide as explained hereinbelow to give a modified propylene polymer, or a method in which a styrene based monomer and glycidyl methacrylate or the like are copolymerized to propylene polymer.

The peroxide used in the production of the modified propylene polymer is not limited particularly and any desired one can be selected appropriately.

As for the organic peroxide, there can be cited various organic peroxides which have been exemplified as material for preparing the modified polyphenylene ether.

The modified propylene polymer as component (b) can be used singly or two or more kinds thereof can be used in combination.

The non-modified propylene polymer can be used singly or two or more kinds thereof can be used in combination.

If desired, the component (b) may be blended with various additives such as antioxidant, heat stabilizer, light stabilizer, antistatic agent, inorganic or organic colorant, anticorrosive agent, crosslinking agent, blowing agent, lubricant, plasticizer, fluorescent agent, surface smoothness improving agent, surface gloss improving agent, and the like.

Blending ratio between the components (a) and (b) may be varied widely in the range of 1 to 98% by weight of (a) : 99 to 2% by weight of (b). In the case where the content of the component (b) is less than 2% by weight, there is obtained less improvement in processability. On the other hand, in the case where the content of the component (b) is more than 98% by weight, thermal properties such as heat distortion temperature decreases. Therefore, conditions outside the above-described range are undesirable.

The resin composition of this invention may contain as component (c) a rubber-like substance containing at least one rubber-like substance having a polar group in order to improve particularly both impact resistance and coatability, if desired.

The polar group referred to herein means those polar groups which contribute to improvement of the coatability of the resin composition and are preferably of a structure having affinity for paints to be coated. The polar groups include, for example, groups of the formulas below:

  (VI)

  (VII)

  (VIII)

  (IX)

  (X)

  (XI)

  (XII)

  (XIII)

wherein $R_{18}$ and $R_{19}$ each represent a hydrogen atom or a hydrocarbon group having 1 to 8 carbons toms or a halogen atom.

In this invention, a rubber-like substance which contains no polar group may be blended, if desired.

Further, the component (c) may include modified ones which are obtained from a rubber-like substance having an anhydride group by ring opening addition reaction of its anhydride group with an alcohol.

Specific examples of the polar group-containing rubber-like substance are ethylene/α-olefin copolymer modified with an unsaturated carboxylic acid or its anhydride such as maleic acid, fumaric acid, itaconic acid, citraconic acid, nadic acid, and anhydride thereof, and acrylic acid, methacrylic acid and the like; ethylene/α-olefin copolymer modified with an unsaturated nitrile compound such as acrylonitrile, methacrylonitrile, etc.; ethylene/α-olefin copolymer modified with an unsaturated carboxylic acid ester such as methyl acrylate, ethyl acrylate, dimethyl maleate, glycidyl methacrylate, etc.; ethylene/α-olefin copolymer modified with an unsaturated ether such as allyl glycidyl ether, vinyl ethyl ether, etc.; ethylene/α-olefin copolymer modified with a halogen-containing vinyl monomer such as allyl chloride, vinyl chloride, vinylidene chloride, etc.; ethylene/α-olefin copolymer modified with an unsaturated silane compound which contains in its molecule a vinyl group and at least one —Si—OR bond such as vinyltrimethoxysilane, vinyl-triethoxysilane, etc. In addition, there can be used ethylene/α-olefin copolymer modified with vinylpyridine, vinylpyrolidone or the like, and halogenated ones such as chlorinated or brominated rubber-like substance can be used although the latter is limited mainly to ethylene/propylene/diene rubber.

The ethylene/α-olefin copolymer rubber which constitutes the base material for the polar group containing ethylene/α-olefin copolymer rubber includes copolymer rubbers of ethylene with other α-olefin such as propylene, butene-1, pentene-1, hexene-1, 4-methylpentene-1 or octene-1 and terpolymer rubbers of ethylene/propylene/butene-1 terpolymer, and the like. Among them, ethylene/propylene copolymer rubber and ethylene/butene-1 copolymer rubber are preferred.

The ethylene content of the ethylene/α-olefin copolymer rubber is 15 to 85% by weight, preferably 40 to 80% by weight. Highly crystalline copolymers having an ethylene content of above 85% by weight are difficult to process under ordinary rubber molding conditions and those having an ethylene content of below 15% by weight are undesirable since they have increased glass transition point (Tg), which deteriorates their rubber-like properties. Preferred glass transition point is −10° C. or less.

Ethylene/α-olefin/non-conjugated diene terpolymer rubber can also be used. However, it is required that the content of the non-conjugated diene is 20% by weight or less. This is because with more than 20% by weight of non conjugated diene, gelation occurs while kneading, which results in deterioration of the flowability of the resin composition and thus is undesirable.

Preferred examples of the non-conjugated diene include ethylidenenorbornene, dicyclopentadiene, 1,4-hexadiene, and the like.

It is preferred that the number average molecular weight of the copolymer rubber is in the range of 10,000 to 100,000 in order to facilitate kneading.

When the molecular weight is too small, it is difficult to handle the copolymer rubber upon supplying it to an extruder. On the other hand, the flowability of the copolymer decreases to make it difficult to handle the copolymer rubber when its molecular weight is too large.

Mooney viscosity ($ML_{1+4}$, 121° C.) is preferably 5 to 120.

Molecular weight distribution is not limited particularly. However, preferred range of Q value (weight average molecular weight/number average molecular weight) is 1 to 30, more preferably 2 to 20.

Other examples of the polar group-containing rubber-like substance are those which are obtained by modifying butadiene rubber, styrene/butadiene rubber, styrene/butadiene block copolymer, styrene/isoprene block copolymer, styrene/ethylene/propylene block copolymer, styrene/ethylene/butene block copolymer, acrylonitrile/butadiene rubber or the like with an unsaturated carboxylic acid or the like. The rubber-like substance modified with a monomer having two or more kinds of polar groups are also included in the component (c).

There is no limitation on the method of producing the modified rubber-like substance and there may be used any known methods such as suspension polymerization method, emulsion polymerization method, solution polymerization method or bulk polymerization method (including a method in which a polymerization tank is used and as well a method in which an extruder is used) and the like.

The polar group-containing rubber-like substance may also include polychlorobutadiene, butadiene/acrylonitrile copolymer, perfluoro rubber, fluorine rubber, chloroprene rubber, silicone rubber, polysulfide rubber, epoxy group-containing copolymer, polyamide elastomer, epichlorohydrin rubber, and the like.

The component (c) may also include the polar group-containing rubber-like substance graft-copolymerized with styrene and/or a monomer copolymerizable with styrene.

In this invention, there is no limitation on the amount of the functional group(s) in the functional group-containing rubber-like substance but it is preferred that the amount of polar groups or derivatives thereof in the rubber like substance is 0.1 to 30% by weight. Below 0.1% by weight, no contribution is observed to improvement in the coatability while above 30% by weight there is a problem in the processability of the resin composition.

In this invention, a rubber-like substance having no polar group may be blended, if desired. Specific examples thereof include natural rubber, butadiene polymer, butadiene/styrene copolymer (all types including random, block and graft copolymers), or their hydrogenation products, isoprene polymer, isobutylene polymer, isobutylene/butadiene copolymer, isobutylene/isoprene copolymer, ethylene/propylene copolymer, ethylene/butene copolymer, ethylene/propylene/styrene terpolymer, styrene/isoprene copolymer or their hydrogenation products, styrene/butylene copolymer, styrene/ethylene/propylene terpolymer, butyl rubber, ethylene/propylene/non-conjugated diene terpolymer, etc.

The rubber-like substance may be prepared by any methods (e.g., emulsion polymerization, solution polymerization, etc.) using any type of catalysts (e.g., peroxides, trialkylaluminum, lithium halides, nickel based catalyst, etc.).

In addition, there can be used those rubber-like substances having various degree of crosslinking, those having various proportions of microstructures (e.g, cis structure, trans-structure, vinyl group, etc.), or those having various mean particle size of rubber particles.

Various copolymers including random copolymers, block copolymers, graft copolymers, etc. can be used as the rubber-like substance in the present invention. Also, modified products derived from these copolymers can be used as the rubber-like substance.

These rubber-like substances (inclusive of modified products) can be used singly or as a mixture of two or more of them.

The rubber-like substance containing at least one rubber-like substance having a polar group used as component (c) in this invention may be present in an amount of 0 to 50 parts by weight per 100 parts by weight of the sum of the components (a) and (b). When its content is above 50 parts by weight, excellent properties inherent to polyphenylene ether are weakened undesirably.

The resin composition of this invention may contain a melt flow characteristics improving agent as component (d), if desired.

If color separation phenomenon occurs in shaped articles by injection molding of the thermoplastic resin composition composed of the components (a), (b) and (c) according to this invention, or if the resin composition has insufficient moldability, the component (d) can be blended to improve the melt flow characteristics of the resin composition, prevent the occurrence of color separation phenomenon in injection molded articles, or improve the moldability of the resin composition.

Any known melt flow characteristics improving agent can be used in this invention.

Preferred examples of the component (d) are white oil, liquid paraffin, low molecular weight hydrocarbon resin, low molecular weight polyolefin and the like. Modified products thereof can also be used. By the term "modified products" as used herein is meant the above-described resins and low molecular weight substances which are modified with one or more monomers selected from styrene based monomers and monomers having a polar group. The styrene monomers used here are the same as those of general formula (V) used in the modification of propylene polymer described above. The polar groups in the polar group-containing monomer are the same polar groups that are used for the rubber-like substance as the component (c).

White oil refers to petroleum fraction obtained by high degree of purification and is a mixture of paraffin- and naphthene-series saturated hydrocarbons but does not contain impurities such as aromatic compounds, acids, sulfur-containing compounds and the like.

The liquid paraffin is a substance obtained by removing unsaturated fraction, aromatic fraction, sulfur fraction and the like after distilling crude oil at atmospheric pressure and then under vacuum.

Preferably, white oil and liquid paraffin have a viscosity at 37.8° C. according to JIS K 2283 (SUS Second) of 40 to 400. The viscosity outside this range is unsuitable since the melt flow characteristics of the resin composition is insufficient or decrease in the kinetic properties thereof is considerable.

The low molecular weight hydrocarbon resin includes those resins which are generally known as petroleum resin, terpene/phenolic resin, terpene resin, rosin resin, cumarone/indene resin, aromatic hydrocarbon resin, alicyclic saturated hydrocarbon resin and the like, and hydrogenation products thereof and modified products thereof such as those modified, for example, with acids.

The above described petroleum resin is a resin which is produced by polymerizing an unsaturated hydrocarbon fraction obtained as by decomposition of petroleum, i.e., an unsaturated hydrocarbon fraction which is a by-produced fraction having a boiling point of 20° to 280° C. obtained upon producing ethylene, propylene, butadiene, etc. by thermal cracking such as so-called steam cracking, gas phase thermal decomposition, sand cracking or the like of petroleum such as LPG, light or heavy naphtha, kerosene or gas oil fraction, heavy oil or crude oil.

The aromatic hydrocarbon resin is an aromatic hydrocarbon oligomer obtained by the polymerization of cracked naphtha, i.e., a mixture of unsaturated hydrocarbons obtained by cracking petroleum and composed mainly of aromatic hydrocarbons whose representative examples are mixed vinyltoluenes and mixed vinylxylenes.

The cumarone/indene resin is derived from a mixture of unsaturated polycyclic aromatic hydrocarbons contained in gas oil fraction formed by dry distillation of coal.

The terpene/phenolic resin and terpene resin are derived from petroleum naphtha.

The rosin resin is a polymer of rosin mainly composed of abietic acid, dextropimaric acid and the like which can be obtained by steam distillation of terpentine secreted from pines.

The molecular weight of the low molecular weight hydrocarbon resin may vary depending on the kind of the resin but generally it is in the range of 200 to 5,000, preferably 300 to 3,000, and more preferably 350 to 2,500. When the molecular weight is too small, excellent performance which polyphenylene ether has inherently is deteriorated. On the other hand, it is undesirable when the molecular weight is too large since no effect is observed on improvement in the melt flow characteristics of the resin composition.

As for the melt flow characteristics improving agent, the component (d), the above-exemplified compounds may be used singly or two or more of them may be used in combination. Suitable amount of the melt flow characteristics improving agent is in the range of 0 to 30 parts by weight per 100 parts by weight of the sum of the components (a), (b) and (c). If the amount of the melt flow characteristics improving agent exceeds 30 parts by weight, it is undesirable since the heat resistance of the resin composition is insufficient.

Upon practicing this invention, it is possible to add to the composition reinforcing agents such as glass fiber and carbon fiber, inorganic or organic fillers such as carbon black, silica and $TiO_2$, plasticizers, flame retardants, dyestuffs, pigments and the like before the composition can be kneaded.

More particularly, the reinforcing agent is an additive which is blended with resin compositions in order to increase mechanical properties such as flexural strength, modulus in flexure, tensile strength and modulus in tension and thermal properties such as heat distortion temperature. Examples thereof are alumina fiber, carbon fiber, glass fiber, high elastic polyamide fiber, high elastic polyester fiber, silicon carbide fiber, titanium whisker and the like.

The reinforcing agent may be added in amounts which are sufficient to exhibit reinforcing effect, and generally is used in an amount of preferably about 5 to 100 parts by weight per 100 parts by weight of the resin composition of this invention.

Particularly preferred reinforcing agent is glass. It is preferred to use glass fiber filaments made of borosilicate glass containing gypsum/aluminum whose sodium content is relatively low, which is known as "$\Sigma$" glass. However, in the case where not so much importance is put on the electric properties, other glass, for example, a low sodium content glass which is known as "C" glass is also useful. Filaments can be prepared by conventional methods such as steam or air blowing, flame blowing and mechanical drawing. Preferred filaments which are used for reinforcing plastics are made by mechanical drawing. Usually, the filaments have a diameter of about 2 to 20 $\mu m$, which however is not critical in this invention. The length of the glass filaments is not critical either. The glass filaments may be bundled to form a composite fiber, which may then be bundled into a thread, rope or roving or woven into a mat. Thus, the shape of the glass filament when in use is not critical in this invention. However, upon producing the resin composition of this invention, it is convenient to use glass filament in the form of strands cut down to have a length of about 0.3 to 3 cm, preferably shorter than about 0.6 cm.

The flame retardant which is useful in this invention includes a group of compounds well known in the art. Generally, there are used more important compounds which contain one or more elements that can give flame retardancy to the compounds such as bromine, chlorine, antimony, phosphor and nitrogen. For example, there can be used halogenated organic compounds antimony oxide, a mixture of antimony oxide and halogenated organic compound, a mixture of antimony oxide and a phosphor compound, simple phosphor or a phosphor compound, a mixture of a phosphor compound or a phosphor-nitrogen bond-containing compound and a halogen-containing compound, or combinations of two or more of them.

The amount of the flame retardant is not critical and it is sufficient to use the flame retardant in amounts enough to exhibit flame retarding effect. It is unwise to use it in too large an amount since deterioration of the physical properties occur, e.g., decrease in the softening point, of the resin composition. Suitable amount thereof is 0.5 to 50 parts by weight, preferably 1 to 25 parts by weight, and more preferably 3 to 15 parts by weight, per 100 parts by weight of the polyphenylene ether or composition containing polyphenylene ether, the component (a).

The halogen-containing compound useful as a flame retardant includes a compound of the following formula:

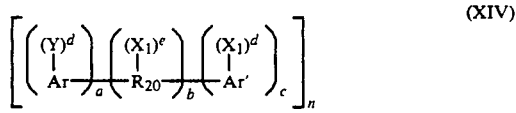

(XIV)

wherein n is an integer of 1 to 10, $R_{20}$ is a group selected from the class consisting of an alkylene group, an alkylidene group, an alicyclic bond (e.g., a methylene group, an ethylene group, a propylene group, an isopropylene group, an isopropylidene group, a butylene group, an isobutylene group, an amylene group, a cyclohexylene group, a cyclopentylidene group, etc), an ether bond, a carbonyl group, an amine bond, a sulfur-containing bond (e.g., sulfide, sulfoxide, sulfone), a carbonate group and a phosphor-containing bond.

$R_{20}$ may be a group having two or more alkylene or alkylidene bonds connected to each other by one or more of an amino group, an ether group, an ester group, a carbonyl group, a sulfide group, a sulfoxide group, a sulfone group, a phosphor-containing group.

Ar and Ar', which may be the same or different, are a monocyclic or polycyclic carbocyclic aromatic hydrocarbon group such as phenylene group, a biphenylene group, a terphenylene group, a naphthylene group, etc.

Y is a substituent selected from the class consisting of an organic group, an inorganic group, and an organic metal group. The substituent represented by Y includes (i) a halogen atom such as chlorine, bromine, iodine or fluorine, (2) an ether group of general formula —OE wherein E is the same monovalent hydrocarbon group as defined for $X_1$ described hereinbelow, (3) an —OH group, (4) a monovalent hydrocarbon group, or (5) other substituent, e.g., a nitro group, a cyano group, etc. When d is 2 or more, Y's may be the same or different.

$X_1$ is a monovalent hydrocarbon group, for example, an alkyl group such as a methyl group, an ethyl group, a propyl group, an isopropyl group, a butyl group and a decyl group; an aryl group such as a phenyl group, a naphthyl group, a biphenyl group, a xylyl group and a tollyl group; an aralkyl group such as a benzyl group and an ethylphenyl group; an alicyclic group such as a cyclopentyl group and a cyclohexyl group; a monovalent hydrocarbon group having therein an inactive substituent. When two or more $X_1$ groups are used, $X_1$'s may be the same or different.

d is an integer up to a maximum number which corresponds to the maximum number of hydrogen atoms that are present on the aromatic ring represented by Ar or Ar' and that can be substituted.

e is 0 or a positive integer of up to a maximum number which corresponds to the maximum number of hydrogen atoms on the group represented by $R_{20}$ that can be substituted.

a, b and c are each an integer of 0 or more. However, when b is not 0, neither a nor c is 0. Otherwise, one of a or c only may be 0. When b is 0, the aromatic group is connected to each other directly via carbon-to-carbon bond.

The hydroxyl groups or substituents Y on the aromatic group Ar and Ar' may be arranged freely on ortho- (o-), meta- (m-) or para- (p-) positions.

Specific examples of the compounds of the above-described formula are 2,2-bis(3,5-dichlorophenyl)propane, bis(2-chlorophenyl)methane, 1,2-bis(2,6-dichlorophenyl)-ethane, 1,1-bis(4-iodopehnyl)ethane, 1,1-bis(2-chloro-4-iodophenyl)ethane, 1,1-bis(2-chloro-4 methylphenyl)ethane, 1,1-bis(3,5-dichlorophenyl)-ethane, 2,2-bis (3-phenyl-4-bromophenyl)ethane, 2,3-bis(4,6-dichloronaphthyl)propane, 2,2-bis(2,6-dichlorophenyl)-pentane, 2,2-bis(3,5-dichlorophenyl)hexane, bis(4-chlorophenyl)phenylmethane, bis(3,5-dichlorophenyl) cyclohexylmethane, bis(3-nitro-4-bromophenylphenyl) methane, bis(4-oxy-2,6-dichloro-3-methoxyphenyl) methane, 2,2-bis(3,5-dibromo-4-oxyphenyl)propane, 2,2-bis(3,5-dichloro-4-oxyphenyl)propane and 2,2-bis(3-bromo-4-oxyphenyl)propane; bis-aromatic compounds in which two aliphatic groups in the above-described specific compounds are replaced by a sulfide group, a sulfoxy group or the like, for example, tetrabromobenzene, hexachlorobenzene, hexabromobenzene, 2,2'-dichlorobiphenyl, 2,4'-dibromobiphenyl, 2,4'-dichlorobiphenyl, hexabromobiphenyl, octabromobiphenyl and decabromobiphenyl; halogenated diphenyl ether having 2 to 10 carbon atoms; oligomers obtained by polymerizing 2,2-bis(3,5-dibromo-4 oxyphenyl) propane and phosgene and having a degree of polymerization of 1 to 20; and the like.

The halogenated compounds which are preferred as a flame retardant in this invention include halogenated aromatic compounds such as chlorinated benzene, brominated benzene, chlorinated biphenyl, chlorinated terphenyl, brominated biphenyl, and brominated terphenyl; those compounds which contain two phenyl rings intervened by a divalent alkylene group that have at least 2 chlorine or bromine atoms per phenyl ring, or a mixture of at least two of them. Particularly preferred examples are hexabromobenzene and chlorinated biphenyl or terphenyl, and a mixtures of one of them and antimony oxide.

Representative example of the phosphor compound which is used as a flame retardant in this invention is a compound of general formula (XV) and a nitrogen-containing compound similar to the compound of the formula (XV)

(XV)

wherein Q's, which may be the same or different, each represent a hydrocarbon group such as an alkyl group, a cycloalkyl group, an aryl group, an alkyl-substituted aryl group or an aryl-substituted alkyl group; a halogen atom; a hydrogen atom; and combinations thereof.

Suitable examples of the phosphoric acid ester include phenyl didodecyl phosphate, phenyl dineopentyl phosphate, phenylethylene hydrogen phosphate, phenyl bis(3,5,5'-trimethylhexyl), ethyl diphenyl phosphate, 2-ethylhexyl di(p-tollyl) phosphate, diphenyl hydrogen phosphate, bis(2-ethylhexyl) p-tollyl phosphate, tritollyl phosphate, bis(2-ethylhexyl) phenyl phosphate, tris(nonylphenyl) phosphate, phenyl methyl hydrogen phosphate, di(dodecyl) p-tollyl phosphate, triphenyl phosphate, halogenated triphenyl phosphate, dibutyl phenyl phosphate, 2-chloroethyl diphenyl phosphate, p-tollyl bis(2,5,5'-trimethylhexyl) phosphate, 2-ethylhexyl diphenyl phosphate and diphenyl hydrogen phosphate.

Most preferred phosphoric acid ester is triphenyl phosphate. It is also preferred to use triphenyl phosphate in combination with hexabromobenzene or antimony oxide.

Other flame retarding additives are compounds having phosphor-nitrogen bond such as phosphor chloride azide, phosphoric acid ester amide, phosphoric acid amide, phosphine amide, tris(aziridinyl)phosphine oxide or tetrakis(oxymethyl)phosphonium chloride.

The method of preparing the thermoplastic resin composition of this invention is not limited particularly and any known method can be used. For example, it is effective to mix starting materials in a state of solution and then distil off the solvent or precipitate in a non solvent. However, it is practically preferred to carry out melt-kneading in a molten state from an industrial point of view.

For the melt-kneading, there can be used generally employed kneading apparatus such as single- or twin-screw extruders and various types of kneaders. Particularly preferred is high speed twin-screw extruder.

Before kneading, it is preferred to uniformly blend the components in a tumbler or a Henschel mixer. However, the blending may be omitted, if desired, and each component may be fed to a kneader through a metering apparatus.

The resin composition, after kneading, is molded according to injection molding, extrusion molding, press molding blow molding and the like. Alternatively, dry blending of the resin materials is performed at the time of injection molding or extrusion molding without prekneading and direct kneading of the components is performed in the melt processing to produce a shaped article of the resistance composition of this invention.

In this invention, there is no limitation on the order of kneading the components. The components (a), (b), (c) and (d) may be kneaded simultaneously. Alternatively, the components (a) and (b) may be kneaded beforehand, followed by kneading the components (c) and (d). Of course, other orders may also be used.

The resin composition of this invention is a resin composition which has excellent processability, heat resistance, solvent resistance, oil resistance, rigidity, dimensional stability, coatability, uniformity in the appearance, and smoothness, and making the use of these characteristics it can be used for preparing shaped articles, sheets, laminates, and the like by injection molding, extrusion molding, press molding or blow molding.

It can be used particularly for various parts of cars, for example, interior or exterior fitting materials such as bumpers, glove boxes, console boxes, brake oil tanks, radiator grills, cooling fans, lamp housings, air cleaners, instrument panels, fenders, door trims, rear end trims, door panels, wheel covers, side protectors, side seal, garnish, trunk lids, bonnets, sirocco fans, roof, etc., and parts of machines for which mechanical strength and heat resistance are required.

It can also be used as materials for parts of motor cycles, for example, covering materials, muffler covers, leg shields, etc. Furthermore, it can be used as materials for electric and electronic parts for which mechanical strength and heat resistance are required, for example, housings, chassis, connectors, printed substrates, pulleys, and the like.

EXAMPLES

The present invention is explained referring to examples below, wherein they are merely illustrative ones, and the invention is not limited to them. Heat distortion temperature (which is abbreviated as H. D. T.) and Izod impact strength (thickness: 3.2 mm) were measured in accordance with JIS K7207 and JIS K7110, respectively.

The reduced viscosity ($\eta_{sp}/C$) of polyphenylene ether was measured as 0.5 g/dl chloroform solution at 25° C.

For kneading in the production of the resin compositions, twin-screw extruder was used (kneading temperature: 270° to 300° C). The resin compositions obtained were injection molded to prepare test samples and their physical properties were measured.

Tests for coatability were performed as follows.

Preparation of the Test Samples

The resin composition of this invention was molded through a 3 ounce injection molding machine with controlling the resin temperature at 230° C. to obtain samples in the form of plates having a size of (L) 150 mm in length X (W) 90 mm in width X (T) 2 mm in thickness.

Coatability Test

The plate samples were washed in 1,1,1-trichloroethane vapor (74° C.) for 30 seconds and dried at room temperature. Thereafter, they were directly spray-coated with a urethane based coating material (FLEXENE #101, produced by NIPPON BEE CHEMICAL CO., LTD.) and bake-finished in an oven at 120° C. for 30 minutes, followed by standing at room temperature for 24 hours. On the coating film of the above-described coated samples were cut with a razor blade 100 checker squares (10 squares X 10 squares), each square being of a size of 2 mm square, and CELLOTAPE(registered trademark for an adhesive tape manufactured by NICHIBAN CO., LTD.) of a width of 24 mm was pressed thereon with fingers. Thereafter, the end of the adhesive tape was held with fingers and the tape was peeled off from the coated film at a stroke. The number of remaining checkers of the coated film was evaluated as remaining ratio (%).

Components

The following were used as the components (a), (b), (c) and (d) in examples and comparative examples below.

Component (a): Polyphenylene Ether (i) To 3 kg of poly(2,6 dimethylphenylene ether) of $\theta_{sp}/C=0.35$ was added 39 g of maleic anhydride and 20 g of dicumyl peroxide and the mixture was mixed using a Henschel mixer and melt-kneaded in a twin-screw extruder at a temperature of 300° to 320° C., followed by pelletization to obtain pellets of maleic anhydride-modified polyphenylene ether. This modified polyphenylene ether was named as "A-1".

(ii) In the same manner as A-1 except that dicumyl peroxide was omitted, a modified polyphenylene ether was produced, which was named as "A-2".

(iii) In the same manner as A-1 except that glutaric acid was used in place of maleic anhydride, a modified polyphenylene ether was produced, which was named as "A-3".

(iv) To 5 kg of poly(2,6-dimethylphenylene ether) of $\theta_{sp}/C=0.55$ was added 20 liters of xylene and then 500 g of anhydrous trimellityl chloride, and the mixture was left to stand at reflux temperature of xylene for 4 hours with stirring. After cooling, the reaction mixture was poured in 40 liters of methanol to precipitate a modified polyphenylene ether, which was filtered and dried. The modified polyphenylene ether was named as "A-4".

(v) To 3 kg of poly(2,6-dimethylphenylene ether) of $\theta_{sp}/C=0.42$ was added 49 g of glycidyl methacrylate, 10 g of glutaric acid and 18 g of maleic anhydride, and the resulting composition was mixed using a Henschel mixer and then melt-kneaded with a twin-screw extruder at 300° to 330° C. to obtain a modified polyphenylene ether. The modified polyphenylene ether was named as "A 5".

(vi) In the same manner as (v) above except that maleic anhydride was omitted, a modified polyphenylene ether was produced, which was named as "A-6".

(vii) In the same manner as A-5 except that 78 g of styrene was used in place of 10 g of glutaric acid, a modified polyphenylene ether was produced, which was named as "A-7".

Component (b): Modified Propylene Polymer (i) As propylene polymer was used SUMITOMO NOBLEN AS171A (trade name for block propylene polymer, MI=0.8, produced by SUMITOMO CHEMICAL CO., LTD.).

Pellets (1 kg) of SUMITOMO NOBLEN AS171A (trade name) above were charged in a 10 liter autoclave together with 4 liters of water, 100 g of styrene monomer, 26 g of methyl methacrylate, 3.4 g of a dispersing agent (METHOLOSE 90SH-100, a trade name) and a peroxide (PERBUTYL PV, a trade name) and reacted at 110° C. for about 1 hour in nitrogen stream, followed by cooling. Then polystyrene was extracted with methyl ethyl ketone and removed from the reaction mixture to recover styrene- and methyl methacrylate-modified propylene polymer. The polymer was named as "B-1" for brevity.

(ii) In the same manner as B-1 except that 43 g of acrylonitrile was used in place of methyl methacrylate in B-1 and the amount of styrene monomer was changed to 25 g, a polymer was obtained, which was named as "B-2" for brevity.

(iii) In the same manner as B-1 except that styrene monomer in B-1 was omitted and the amount of methyl methacrylate in B-1 was changed to 126 g, a polymer was obtained, which was named as "BR-1" for brevity.

(iv) Pellets (800 g) of a block propylene polymer, SUMITOMO NOBLEN W531 (trade name for a product by SUMITOMO CHEMICAL CO., LTD., MI=8.0) and 300 g of pellets of an ethylene/butene copolymer, SUMITOMO EXCELLEN CN3001 (trade name for a product by SUMITOMO CHEMICAL CO., LTD., density: 0.88 g/cm$^3$) were charged in a 10 liter autoclave together with 4 liters of water, 420 g of styrene monomer, 15 g of a dispersing agent (METHOLOSE 90SH-100, a trade name) and a peroxide (PERBUTYL PV, a trade name) and reacted at 120° C. for about 1 hour in nitrogen stream, followed by cooling. Then grafted propylene polymer and 9rafted ethylene/butene copolymer were recovered. The mixture of modified propylene polymer and the modified ethylene/butene copolymer was named as "B-3" for brevity.

(v) As starting block propylene polymer was used SUMITOMO NOBLEN AY564 (trade name for for a product by SUMITOMO CHEMICAL CO., LTD., MI=15).

Pellets (1 kg) of SUMITOMO NOBLEN AY564 (trade name) above were charged in a 10 liter autoclave together with 3.5 liters of water, 230 g of styrene monomer, 19 g of glycidyl methacrylate, 9 g of a dispersing agent (METHOLOSE 90SH-100, a trade name) and a peroxide (PERBUTYL PV, a trade name) and reacted at 120° C. for about 1 hour in nitrogen stream, followed by cooling. Then polystyrene was extracted with methyl ethyl ketone and removed from the reaction mixture to recover styrene- and glycidyl methacrylate-modified propylene polymer. The polymer was named as "B-4" for brevity.

(vi) In the same manner as (v) above except that styrene monomer was omitted, a polymer composition was obtained, which was named as "BR-4"for brevity.

Component (c): Polar Group-Containing Rubber Like Substance (i) Modified Ethylene/Propylene Rubber Pellets (100 parts by weight) of an ethylene/propylene copolymer rubber, SUMITOMO ESPRENE E201 (trade name for a product by SUMITOMO CHEMICAL CO., LTD., $ML_{1+4}$ 121° C. =27), 2.8 parts by weight of maleic anhydride, 3.4 parts by weight of styrene monomer and 1.0% by weight based on total weight of the resulting mixture of a free-radical initiator composed of propylene homopolymer and 8% by weight based on the weight of the initiator of 1,3-bis(t-butylperoxyisopropyl) benzene (SUNPEROX-TY13, trade name for a product by SANKEN KAKOU CO., LTD.) were mixed with a Henschel mixer, and then melt-kneaded with a twin-screw extruder TEX44SS-30BW-2V type produced by NIPPON SEIKOSHO CO., LTD.in nitrogen atmosphere at kneading temperature of 250° C. at an extrusion rate of 18 kg/hour to prepare an adduct, i.e., a modified ethylene/propylene copolymer rubber with a content of maleic anhydride in the adduct of 1.9% by weight, a content of styrene in the adduct of 1.7% by weight, and a Mooney viscosity at 121° C. ($ML_{1+4}$121° C. ) of 45. The modified ethylene/propylene copolymer rubber was named as "EP-1" for brevity.

(ii) Modified Ethylene/Propylene/Diene Rubber

In a stainless steel autoclave equipped with a stirrer were charged 100 parts by weight of chips of SUMITOMO ESPRENE E-400 (trade name for ethylene/propylene copolymer rubber (EPDM) produced by SUMITOMO CHEMICAL CO., LTD., $ML_{1+4}$ 100° C.=53) as a base rubber, 350 parts by weight of deionized water, 4.0 parts by weight of calcium tertiary phosphate and 4.0 parts by weight of PLURONICK F-68 (trade name for a product by ASAHI DENKA CO., LTD.), and the mixture was stirred in blowing nitrogen gas thereinto to purge air sufficiently.

Thereafter, there were added 23 parts by weight of glycidyl methacrylate and 0.9 part by weight of SUNPEROX TO (trade name for a product by SANKEN KAKOU CO., LTD.) as a free-radical initiator. After elevating the temperature up to 110° C. in 70 minutes, reaction was continued for 1 hour at 110° C. After cooling, glycidyl methacrylate-grafted copolymer rubber was taken out by filtration, washed sufficiently with deionized water and dried under vacuum. The modified ethylene/propylene/diene rubber obtained was named as "EP-2" for brevity.

(iii) Unsaturated Dicarboxylic Anhydride Group-Containing Ethylene Copolymer Sample In a 2 liter reactor equipped with a stirrer was charged continuously under pressure ethylene containing a small amount of propane as a chain transfer agent and solution of maleic anhydride or endic anhydride in each of unsaturated ester compound described in Table 1, and copolymerization was performed at a rate of 1.5 to 3.2 kg/hour at a pressure of 1,500 kg/cm² at polymerization temperature of 170° C. to obtain samples C-1 to C-6 shown in Table 1.

(iv) Alcohol-Modified Ethylene Copolymer Sample

Using a single-screw extruder with a screw diameter of 30 mm, the above-described ethylene copolymer sample C-3 or C-4 and an alcohol described in Table 2 were melt-kneaded at 150°-190° C. to obtain pellets of modified copolymer samples C-7 to C-11. The ratio of maleic anhydride group in the resulting adduct after the ring opening addition reaction was calculated from reduction ratio of infrared absorption band at 1780 cm$^{-1}$.

(v) Polar Group-Containing Rubber-Like Substance

Samples C-12 to C-21 shown in Table 3 were prepared as follows.

(a) Preparation of C-12 to C-15 and C-18 to C-21

C-12 to C-15 and C-18 to C-21 were prepared from various starting rubber-like substances and monomers for modification by melt-kneading them at 150°-220° C. using a single-screw extruder with a screw diameter of 30 mm. The content ratio of the monomer for modification in the modified products was obtained on weight basis.

(b) Preparation of C-16 and C-17

In an autoclave equipped with a stirrer were charged 100 parts by weight of chips of R-12 as a starting base rubber-like substance, 350 parts by weight of deionized water, 5.0 parts by weight of PLURONICK F-68 (trade name for a product by ASAHI DENKA CO., LTD.), and the mixture was stirred with blowing nitrogen gas thereinto to purge air sufficiently.

Thereafter, there were added 57 parts by weight of bromostyrene and 1.0 part by weight of SUNPEROX TO (trade name for a product by SANKEN KAKOU CO., LTD.) as a free-radical initiator. After elevating the temperature up to 110° C. in 90 minutes, reaction was continued for 1 hour at 110° C. to obtain a modified product C-16.

A modified product C-17 was prepared in the same manner as C-16 except that the starting rubber-like substance in C 16 was replaced by EP-2 and 38 parts by weight of acrylonitrile was used in place of 57 parts by weight of bromostyrene. The content ratio of the monomer for modification was obtained on weight basis. The results obtained are shown in Table 3.

Commercially available rubber-like substances which were used in examples and their abbreviations are shown as below.

Acrylonitrile/butadiene rubber: N2155L (trade name for a product by NIPPON SYNTHETIC RUBBER CO., LTD., $ML_{1+4}$ 100° C.=48) (hereafter, abbreviated as "C-22");

Acryl rubber: NIPPOL AR31 (trade name for a product by NIPPON ZEON CO., LTD (hereafter, abbreviated as "C-23");

Epichlorohydrin rubber: (GECHROM 3100 (trade name for a product by NIPPON SYNTHETIC RUBBER CO., LTD.) (hereafter, abbreviated as "C-24");

Fluorine rubber: G-201 (trade name for a product by DAIKIN CO., LTD.) (hereafter, abbreviated as "C-25");

Chlorinated butyl rubber: CHLOROBUTYL 1066 (trade name for a product by EXXON CHEMICAL CO., LTD., $ML_{1+8}$ 100° C.=56) (hereafter, abbreviated as "C-26");

Chloroprene rubber W: (trade name for a product by SHOWA NEOPRENE CO., LTD., $ML_{1+4}$ 100° C.=44) (hereafter, abbreviated as "C-27");

BOND FAST 2B (trade name for a product by SUMITOMO CHEMICAL CO., LTD.) (hereafter, abbreviated as "C-28"); and Ethylene/ethyl acrylate/maleic anhydride copolymer: BONDINE HX8200 (trade name for a product by SUMITOMO CHEMICAL CO., LTD.) (hereafter, abbreviated as "C-29").

TABLE 1

| | Ethylene Copolymer Sample | | | |
|---|---|---|---|---|
| | Content in Copolymer (% by weight) | | | |
| Sample | Component (I) | | Component II | |
| C-1 | Maleic Anhydride | 6.2 | Methyl Methacrylate | 23.3 |
| C-2 | Maleic Anhydride | 4.5 | Methyl Acetate | 11.0 |
| C-3 | Maleic Anhydride | 2.9 | Methyl Acrylate | 7.9 |
| C-4 | Maleic Anhydride | 1.3 | 2-Ethylhexyl Methacrylate | 35.8 |
| C-5 | Endic Anhydride | 9.2 | Butyl Acrylate | 8.7 |
| C-6 | Maleic Anhydride | 8.7 | — | 0 |

TABLE 2

| | Alcohol-Modified Ethylene Copolymer | | | |
|---|---|---|---|---|
| Sample | Ethylene Copolymer | Alcohol for Modification | Amount of Added Alcohol (Molar Ratio per MAH) | Approximate Reaction Rate |
| C-7 | C-3 | Pentaerythritol | 2.1 | 80 |
| C-8 | C-3 | Ethyl Alcohol | 1.2 | 90 |
| C-9 | C-3 | 1,4-Butanediol | 1.7 | 75 |
| C-10 | C-4 | Stearyl Alcohol | 0.8 | 80 |
| C-11 | C-4 | Trimethylolpropane | 3.0 | 85 |

TABLE 3

| | Polar Group-Containing Rubber-Like Substance | | |
|---|---|---|---|
| Sample | Starting Rubber-Like Substance | Monomer of Modification | Content of Monomer for Modification (% by weight) |
| C-12 | EP-1 | Vinyltrimethoxysilane | 7.2 |
| C-13 | R-4 | Chlorine | 0.8 |
| C-14 | C-22 | Maleic Anhydride | 5.2 |
| C-15 | R-11 | Fumaric Acid | 0.7 |
| C-16 | R-12 | Bromostyrene | 35.2 |
| C-17 | EP-2 | Acrylonitrile | 20.1 |
| C-18 | R-13 | Vinyl Chloride | 6.8 |
| | | Allyl Glycidyl Ether | 4.5 |
| C-19 | R-12 | Dimethyl Maleate | 3.0 |
| C-20 | R-6 | Maleic Anhydride | 1.3 |
| C-21 | R-8 | Styrene | 3.3 |
| | | Maleic Anhydride | 2.9 |

The following are the rubber-like substances used as the component (c) other than the above-described functional group-containing rubber-like substances.

In a stainless steel autoclave equipped with a stirrer were charged 100 parts by weight of chips of SUMITOMO ESPRENE E532 (trade name for a product by SUMITOMO CHEMICAL CO., LTD., $ML_{1+4}$ 121° C.=80) as ethylene/α-olefin copolymer rubber, 350 parts by weight of deionized water, 4.0 parts by weight of calcium tertiary phosphate and 4.0 parts by weight of PLURONICK F-68 (trade name for a product by ASAHI DENKA CO., LTD.), and the mixture was stirred with blowing nitrogen gas thereinto to purge air sufficiently.

Thereafter, there were added 16 parts by weight of styrene and 0.75 part by weight of SUNPEROX TO (trade name for a product by SANKEN KAKOU CO., LTD.) as a free-radical initiator. After elevating the temperature up to 110° C. in 90 minutes, reaction was continued for 1 hour. After cooling, styrene-grafted copolymer rubber was taken out by filtration, washed sufficiently with deionized water and dried under vacuum. The modified ethylene/propylene/diene rubber obtained was abbreviated as "R 1".

Commercially available rubber-like substances used in examples were as follows.

Styrene/butadiene rubber: SUMITOMO SBR 1712 (trade name for a product by SUMITOMO CHEMICAL CO., LTD., $ML_{1+4}$ 100° C.=48) (hereafter, abbreviated as "R-2");

Polyisoprene: IR 2200 (trade name for a product by NIPPON SYNTHETIC RUBBER CO., LTD., $ML_{1+4}$ 100° C.=82) (hereafter, abbreviated as "R-3");

Ethylene/propylene/diene rubber: SUMITOMO ESPRENE E305 (trade name for a product by SUMITOMO CHEMICAL CO., LTD., $ML_{1+4}$ 100° C.=57) (hereafter, abbreviated as "R-4");

Styrene/butadiene block copolymer: KRATON D1300X (trade name for a product by SHELL CHEMICAL CO., LTD.) (hereafter, abbreviated as "R-5");

Styrene/isoprene block copolymer: KRATON D1320X (trade name for a product by SHELL CHEMICAL CO., LTD.) (hereafter, abbreviated as "R-6");

Styrene/ethylene/propylene block copolymer: KRATON G1701X (trade name for a product by SHELL CHEMICAL CO., LTD.) (hereafter, abbreviated as "R-7");

Styrene/ethylene/butylene block copolymer: KRATON G1657X (trade name for a product by SHELL CHEMICAL CO., LTD.) (hereafter, abbreviated as "R-8");

Polybutadiene: DIENE R35A (trade name for a product by ASAHI CHEMICAL INDUSTRY CO., LTD.) (hereafter, abbreviated as "R-9");

Natural rubber (hereafter, abbreviated as "R-10");

Styrene/butadiene block copolymer: CALIFLEX TR122 (trade name for a product by SHELL CHEMICAL CO., LTD.) (hereafter, abbreviated as "R-11");

Ethylene/propylene rubber: SUMITOMO ESPRENE E201 (trade name for product by SUMITOMO CHEMICAL CO., LTD., $ML_{1+4}$ 100° C.=45) (hereafter, abbreviated as "R-12"); and Ethylene/butene rubber: TAFMER A (trade name for a product by MITSUI PETROCHEMICAL CO., LTD.) (hereafter, abbreviated as "R-13"). Component (d): Flow Characteristics Improving Agent The flow characteristics improving agents as the component (d) in examples and abbreviations are as follows.

Rosin resin: HARIESTER-L (trade name for a product by HARIMA KASEI CO., LTD.) (hereafter, abbreviated as "D-1").

Terpene resin: CLEARON P-125 (trade name for a product by YASUHARA YUSHI CO., LTD.) (hereafter, abbreviated as "D-2");

White oil: BENOL (trade name for a product by WITKO CO., LTD.) (hereafter, abbreviated as "D-3");

Low molecular weight ethylene/propylene rubber: LUKANT (trade name for a product by MITSUI PETROCHEMICAL CO., LTD.) (hereafter, abbreviated as "D-4");

Maleic anhydride-modified product of D-4 (content of maleic anhydride=1.1% by weight) (hereafter, abbreviated as "D-5");

Low molecular weight polyethylene: SUNWAX 171-P (trade name for a product by SANYO KASEI KOGYO CO., LTD.) (hereafter, abbreviated as "D-6");

Styrene-modified product of D-6 (content of styrene=4.8% by weight) (hereafter, abbreviated as "D-7")

The above-described components were blended in proportions shown in Tables 4 to 7, and the physical properties of the resulting resin compositions were measured. The results obtained are shown in Tables 4 to 7.

TABLE 4

| | RESIN COMPOSITION (Part by Weight) | | | PROPERTIES | | |
|---|---|---|---|---|---|---|
| | Component | | | | | |
| Sample | (a) Modified Poly-Phenylene Ether | (b) Modified Propylene Polymer | (c) Polar Group-Containing Rubber-Like Substance | H.D.T. (4.6 kg/cm², °C.) | Izod Impact (Notched, 23° C., kg · cm/cm) | Coatability Test. Remaining Ratio (%) |
| Ex. 1 | A-1 | | B-1 | 145 | 8 | 98 |

TABLE 4-continued

| Sample | RESIN COMPOSITION (Part by Weight) Component | | | PROPERTIES | | |
|---|---|---|---|---|---|---|
| | (a) Modified Poly-Phenylene Ether | (b) Modified Propylene Polymer | (c) Polar Group-Containing Rubber-Like Substance | H.D.T. (4.6 kg/cm$^2$, °C.) | Izod Impact (Notched, 23° C., kg·cm/cm) | Coatability Test. Remaining Ratio (%) |
| | 30 | 70 | 0 | | | |
| Ex. 2 | A-1 | B-1 | EP-1 | 136 | 12 | 100 |
| | 30 | 70 | 12 | | | |
| Ex. 3 | A-2 | B-2 | C-1 | 131 | 11 | 99 |
| | 25 | 75 | 8 | | | |
| Ex. 4 | A-2 | B-2 | C-2 | 133 | 13 | 92 |
| | 25 | 75 | 8 | | | |
| C. Ex. 1 | A-1 | B-1 | EPR*$^1$ | 134 | 7 | 85 |
| | 30 | 70 | 12 | | | |
| C. Ex. 2 | PPE*$^2$ | B-1 | EP-1 | 131 | 8 | 79 |
| | 30 | 70 | 12 | | | |
| C. Ex. 3 | A-1 | BR-1 | EP-1 | 125 | 4 | 83 |
| | 30 | 70 | 12 | | | |
| C. Ex. 4 | A-2 | PP*$^3$ | C-2 | 121 | 5 | 60 |
| | 25 | 75 | 8 | | | |

Notes for Table 4:
*$^1$SUMITOMO ESPRENE E201 (trade name for a product by SUMITOMO CHEMICAL CO., LTD.)
*$^2$Polyphenylene ether, $\eta_{sp}/C = 0.31$
*$^3$SUMITOMO NOBLEN AS171A (trade name for a product by SUMITOMO CHEMICAL CO., LTD.)

TABLE 5

| Sample | RESIN COMPOSITION (Part by Weight) Component | | | | PROPERTIES | | |
|---|---|---|---|---|---|---|---|
| | (a) Modified Poly-Phenylene Ether | (b) Modified Propylene Polymer | (c) Polar Group-Containing Rubber-Like Substance | Rubber-Like Substance | H.D.T. (4.6 kg/cm$^2$, °C.) | Izod Impact (Notched, 23° C., kg·cm/cm) | Coatability Test. Remaining Ratio (%) |
| Ex. 5 | A-3 21 | B-3 59 | C-3 12 | R-1 5  R-3 3 | 117 | 31 | 100 |
| Ex. 6 | A-3 21 | B-3 59 | C-4 7  C-7 5 | R-4 4  R-6 2  R-10 2 | 115 | 26 | 98 |
| C. Ex. 5 | A-3 21 | B-3 59 | 0 | R-4 4  R-6 2  R-10 2 | 123 | 11 | 78 |
| C. Ex. 6 | A-3 21 | B-3 59 | 0 | R-4 10  R-6 5  R-10 5 | 110 | 20 | 82 |
| Ex. 7 | A-3 8 | B-3 72 | C-5 6  C-12 4 | R-5 5  R-12 5 | 98 | 37 | 100 |
| Ex. 8 | A-4 37 | B-1 53 | C-6 4  C-13 2  C-22 2 | R-7 2 | 127 | 22 | 97 |
| Ex. 9 | A-5 37 | B-4 53 | C-8 3  C-15 2 | R-1 3  R-11 2 | 130 | 29 | 99 |
| Ex. 10 | A-5 37 | B-2 53 | EP-2 4  C-16 2 | R-8 2  R-9 2 | 137 | 18 | 96 |
| Ex. 11 | A-1 28  A-4 9 | B-1 42  B-5 11 | C-9 4  C-23 2 | R-8 2  R-9 2 | 135 | 23 | 100 |
| Ex. 12 | A-6 37 | B-1 53 | C-10 3  C-11 3 | R-1 2  R-8 2 | 133 | 20 | 98 |
| Ex. 13 | A-6 27 | B-5 63 | C-14 6  C-24 4 | R-7 10 | 118 | 33 | 100 |

TABLE 6

| Sample | RESIN COMPOSITION (Part by Weight) Component | | | | PROPERTIES | | |
|---|---|---|---|---|---|---|---|
| | (a) Modified Poly-Phenylene Ether | (b) Modified Propylene Polymer | (c) Polar Group-Containing Rubber-Like Substance | Rubber-Like Substance | H.D.T. (4.6 kg/cm$^2$, °C.) | Izod Impact (Notched, 23° C., kg·cm/cm) | Coatability Test. Remaining Ratio (%) |
| Ex. 14 | A-5 12 | B-5 72 | C-17 10 | R-12 6 | 111 | 28 | 95 |
| Ex. 15 | A-6 12 | B-2 72 | C-18 7  C-25 3 | R-9 4  R-4 2 | 113 | 25 | 97 |
| Ex. 16 | A-1 12 | B-3 72 | C-9 6  C-19 4 | R-11 6 | 110 | 30 | 100 |
| Ex. 17 | A-2 31 | B-1 28  B-5 22 | C-20 10  C-26 6  C-27 3 | 0 | 123 | 32 | 96 |
| Ex. 18 | A-3 31 | B-4 50 | C-21 11  C-28 8 | 0 | 126 | 25 | 98 |

TABLE 6-continued

| | RESIN COMPOSITION (Part by Weight) Component | | | | PROPERTIES | | |
|---|---|---|---|---|---|---|---|
| Sample | (a) Modified Poly-Phenylene Ether | (b) Modified Propylene Polymer | (c) Polar Group-Containing Rubber-Like Substance | Rubber-Like Substance | H.D.T. (4.6 kg/cm$^2$, °C.) | Izod Impact (Notched, 23° C., kg · cm/cm) | Coatability Test. Remaining Ratio (%) |
| C. Ex. 7 | A-3 31 | BR-4 50 | C-21 C-28 11 8 | 0 | 112 | 12 | 80 |
| C. Ex. 8 | A-3 31 | B-2 50 | 0 | R-7 19 | 124 | 27 | 75 |

TABLE 7

| | RESIN COMPOSITION (Part by Weight) Component | | | | PROPERTIES | | | |
|---|---|---|---|---|---|---|---|---|
| Sample | (a) Modified Poly-Phenylene Ether | (b) Modified Propylene Polymer | (c) Polar Group-Containing Rubber-Like Substance | (d) | MI*$^3$ (g/10 min) | H.D.T. (4.6 kg/cm$^2$, °C.) | Izod Impact (Notched, 23° C., kg · cm/cm) | Coatability Test. Remaining Ratio (%) |
| Ex. 19 | A-5 48 | B-1 52 | C-29 10 | D-1 5 | 23 | 148 | 13 | 97 |
| Ex. 20 | A-4 48 | B-1 52 | C-6 10 | D-2 5 | 31 | 144 | 12 | 100 |
| Ex. 21 | A-6 55 | B-4 45 | C-2 C-15 7 3 | D-3 7 | 40 | 151 | 11 | 98 |
| Ex. 22 | A-4 55 | B-4 45 | C-7 12 | 0 | 12 | 156 | 9 | 95 |
| Ex. 23 | A-7 40 | B-3 43 | C-20 11 | D-4 6 | 34 | 140 | 10 | 92 |
| Ex. 24 | A-2 40 | B-3 43 | C-5 C-27 6 5 | D-5 6 | 25 | 148 | 8 | 97 |
| Ex. 25 | A-5 40 | B-1 B-5 30 13 | EP-1 C-24 7 4 | D-6 6 | 42 | 138 | 9 | 96 |
| Ex. 26 | A-1 A-4 30 10 | B-2 43 | C-13 C-22 8 3 | D-7 6 | 27 | 141 | 11 | 95 |
| C. Ex. 9 | PPE*$^1$ 55 | PP*$^2$ 45 | C-7 12 | 0 | 7 | 146 | 6 | 65 |

Notes:
*$^1$Non-modified polyphenylene ether $\eta_{sp/C}$ = 0.55
*$^2$Non-modified propylene polymer, SUMITOMO NOBLEN AY564 (trade name for a product by SUMITOMO CHEMICAL CO., LTD.)
*$^3$Temperature: 260° C., Load: 10 kg From the results shown in Tables 4 to 7, it can be seen that resin compositions in which modified polyphenylene ether, modified propylene polymer and rubberlike substance containing a polar group are blended are excellent in their heat resistance, kinetic properties and coatability.

As described above, the resin composition of this invention not only has excellent molding processability but also can be molded into shaped articles superior in heat resistance, kinetic properties as well as in coatability.

The novel resin composition provided by the present invention can easily be worked by shaping procedures which are familiar to the skilled artisan, for example, injection molding, extrusion molding, etc., to give rise to various products which are superior in balance among physical properties such as impact resistance, heat resistance and hardness and which have excellent uniformity in appearance and in smoothness.

What is claimed is:

1. A thermoplastic resin composition comprising
(a) a modified polyphenylene ether or a composition containing it,
(b) (i) a modified propylene polymer comprising propylene polymer which is graft-copolymerized with a styrene based monomer or with a mixture of a styrene based monomer and a monmer copolymerizable therewith, or (ii) a composition containing the modified propylene polymer in (b)-(i) and propylene polymer, and
(c) a rubber-like substance containing at least one rubber-like substance having a polar group, wherein the proportion of the component (a) to the component (b) is 1 to 98% by weight of (a) : 99 to 2% by weight of (b), wherein the component (c) is present in an amount of 11 to 50 parts by weight per 100 parts by weight of the sum of the components (a) and (b).

2. A thermoplastic resin composition comprising
(a) a modified polyphenylene ether or a composition containing it,
(b) (i) a modified propylene polymer which is graft copolymerized with a styrene based monomer or with a mixture of a styrene based monomer and a monomer copolymerizable therewith, or (ii) a composition containing the modified propylene polymer in (b)-(i) and propylene polymer,
(c) a rubber-like substance containing at least one rubber like substance having a polar group, and
(d) a melt flow characteristics improving agent.

3. A thermoplastic resin composition comprising
(a) a modified polyphenylene ether or a composition containing it,
(b) (i) a modified propylene polymer which is graft-copolymerized with a styrene based monomer or with a mixture of a styrene based monomer and a monomer copolymerizable therewith, or (ii) a composition containing the modified propylene polymer in (b)-(i) and propylene polymer,
- (c) a rubber-like substance containing at least one rubber-like substance having a polar group, and
- (d) a melt flow characteristics improving agent, wherein the proportion of the component (a) to the component (b) is 1 to 98% by weight of (a) : 99 to 2% by weight of (b), wherein the component (c) is present in an amount of 11 to 50 parts by weight per 100 parts by weight of the sum of the components (a) and (b), and wherein the component (d) is present in an amount of 0 to 30 parts by weight per 100 parts by weight of the sum of the components (a), (b) and (c).

4. A thermoplastic resin composition as claimed in any one of claims 1, 2 and 3, wherein said modified polyphenylene ether or said composition containing said modified polyphenylene ether is a modified polyphenylene ether obtained by modifying polyphenylene ether with a polyfunctional compound (e) having in its molecule at least one group selected from the class consisting of a carboxylic acid group, an acid anhydride group, an acid amide group, an imide group, a carboxylic acid ester group, an epoxy group, an amino group and a hydroxyl group in the presence or absence of a free radical initiator.

5. A thermoplastic resin composition as claimed in claim 4, wherein said polyfunctional compound (e) is a compound (f) which has in its molecule (i) a carbon-to-carbon double bond or a carbon to-carbon triple bond, and (ii) at least one functional group selected from a carboxylic acid group, an acid anhydride group, an acid amide group, an imide group, a carboxylic acid ester group, an epoxy group, an amino group and a hydroxyl group.

6. A thermoplastic resin composition as claimed in claim 4, wherein said polyfunctional compound (e) is a compound which is selected from an aliphatic carboxylic acid, acid ester and acid amide of the formula (IV) and/or derivatives (g) of the compound

(IV)

wherein $R_7$ is a straight- or branched-chain saturated aliphatic hydrocarbon group having 2 to 20 carbon atoms; $R_8$ is selected from the class consisting of a hydrogen atom, an alkyl group, an aryl group, an acyl group and a carbonyl dioxy group each having 1 to 10 carbon atoms; each $R_9$ is independently selected from the class consisting of a hydrogen atom, an alkyl group and an aryl group each having 1 to 20 carbon atoms; each $R_{10}$ and $R_{11}$ are independently selected from the class consisting of a hydrogen atom, an alkyl group and an aryl group each having 1 to 10 carbon atoms, and m, n and s are 0 or integers of 1 or more, provided that $m+n+s \geq 2$.

7. A thermoplastic resin composition as claimed in claim 4, wherein said polyfunctional compound (e) is a compound (h) which has in its molecule (i) an acid halide group, and (ii) at least one functional group selected from a carboxylic acid group, carboxylic anhydride group, acid ester group and acid amide group.

8. A thermoplastic resin composition as claimed in any one of claims 1, 2 and 3, wherein said modified polyphenylene ether or said composition containing said modified polyphenylene ether as the component (a) is a modified polyphenylene ether obtained by modifying polyphenylene ether with an epoxy compound (j), which is composed of a condensation polymer of a compound having an oxirane group in its molecule and/or a divalent phenol, with epichlorohydrin in the presence or absence of a free radical initiator.

9. A thermoplastic resin composition as claimed in any one of claims 1, 2 and 3, wherein said modified polyphenylene ether or said composition containing said modified polyphenylene ether as the component (a) is a modified polyphenylene ether obtained by modifying polyphenylene ether with an organosilane compound (k), which contains in its molecule (i) at least one silicon atom bonded to a carbon atom via an oxygen atom, (ii) a carbon-to-carbon double bond or a carbon-to-carbon triple bond, and (iii) at least one functional group selected from an amino group, a mercapto group, a carboxylic acid group, an acid anhydride group, an acid amide group, a carboxylic acid ester group, an imide group and a hydroxyl group, in the presence or absence of a free-radical initiator.

10. A thermoplastic resin composition as claimed in any one of claims 2 and 3, wherein said melt flow characteristics improving agent as the component (d) is selected from the group consisting of white oil, liquid paraffin, a low molecular weight hydrocarbon resin and a low molecular weight polyolefin.

11. A shaped article comprising a thermoplastic resin composition as claimed in any one of claims 1, 2 and 3.

12. A part of car, comprising a thermoplastic resin composition as claimed in any one of claims 1, 2 and 3.

13. A part of car as claimed in claim 12, wherein said part is selected from the group consisting of bumpers, glove boxes, console boxes, brake oil tanks, radiator grills, cooling fans, lamp housings, air cleaners, instrument panels, fenders, door trims, rear end trims, door panels, wheel covers, side protectors, air intakes, side seal, garnish, trunk lids, bonnets, sirocco fans, and roof.

* * * * *